(12) United States Patent
Lee et al.

(10) Patent No.: US 10,546,087 B1
(45) Date of Patent: Jan. 28, 2020

(54) INTELLECTUAL PROPERTY (IP) BLOCKS WITH CUSTOMIZABLE CONFIGURATION STATUS REGISTER (CSR) CIRCUITRY

(71) Applicant: Altera Corporation, San Jose, CA (US)

(72) Inventors: Sze Yin Lee, Bukit Mertajam (MY); Arul Paniandi, Bayan Lepas (MY); Chong Tean Chuah, Bandar Baru (MY); Siew Ling Yeoh, Batu Maung (MY); Yun Hui Moh, Langkap (MY)

(73) Assignee: Altera Corporation, San Jose, CA (US)

( * ) Notice: Subject to any disclaimer, the term of this patent is extended or adjusted under 35 U.S.C. 154(b) by 603 days.

(21) Appl. No.: 15/082,870

(22) Filed: Mar. 28, 2016

(51) Int. Cl.
G06F 17/50 (2006.01)

(52) U.S. Cl.
CPC .................. G06F 17/5054 (2013.01)

(58) Field of Classification Search
None
See application file for complete search history.

(56) References Cited

U.S. PATENT DOCUMENTS

| | | | |
|---|---|---|---|
| 5,819,050 A | 10/1998 | Boehling et al. | |
| 6,640,322 B1 | 10/2003 | Schulz | |
| 6,959,428 B2 * | 10/2005 | Broberg | G06F 17/5045 716/102 |
| 7,131,020 B2 | 10/2006 | Moll et al. | |
| 7,268,582 B1 * | 9/2007 | Zheng | H03K 19/17732 326/38 |
| 7,277,965 B2 | 10/2007 | Meyer et al. | |
| 7,827,517 B1 * | 11/2010 | Orthner | G06F 17/5045 703/14 |
| 8,145,878 B2 | 3/2012 | Sundararaman et al. | |
| 8,910,109 B1 * | 12/2014 | Orthner | H03K 19/003 110/116 |
| 8,942,248 B1 * | 1/2015 | Cheung | H04L 7/0041 370/412 |
| 9,652,410 B1 * | 5/2017 | Schelle | G06F 13/10 |

(Continued)

OTHER PUBLICATIONS

Meng et al. Structure Reuse Methodology based on XML Schema for Functional Level Design: A Case Study in Configuration Register Module IEEE, ISCIT 2009.*

(Continued)

*Primary Examiner* — Rehana Perveen
*Assistant Examiner* — Cuong V Luu
(74) *Attorney, Agent, or Firm* — Jason Tsai

(57) ABSTRACT

A method for generating configuration information using a computer aided design (CAD) tool includes a step to receive an intellectual property block. The method also includes a step to receive a configuration and status register (CSR) data file. The configuration and status register data file includes a user selected portion of runtime features from all of the available runtime features of the intellectual property block. The method may also include a step to receive an additional intellectual property block and an additional configuration and status register data file. Based on the two intellectual property blocks and the configuration and status register data files, a consolidated configuration and status register block may be formed. These intellectual property block(s) and configuration status register block(s) are formed on an integrated circuit device.

19 Claims, 7 Drawing Sheets

(56) References Cited

U.S. PATENT DOCUMENTS

2004/0122990 A1    6/2004  Meyer et al.
2005/0251768 A1*  11/2005  Iima .................... G06F 17/5022
                                                          716/106
2014/0229706 A1*   8/2014  Kuesel .................... G06F 15/76
                                                          712/31

OTHER PUBLICATIONS

Murray et al. Leveraging IP-XACT standardized IP interfaces for rapid IP integration ARM 2015.*

* cited by examiner

INTELLECTUAL PROPERTY (IP) BLOCKS WITH CUSTOMIZABLE CONFIGURATION STATUS REGISTER (CSR) CIRCUITRY

BACKGROUND

Intellectual property (IP) blocks are reference circuit designs that can be implemented on a programmable logic device (PLD) to perform functions that are defined by the IP block. The IP blocks can be programmed into the programmable logic device using an electronic design automated (EDA) tool.

Each intellectual property block may include a configuration and status register block (sometimes referred to as a configuration status register or CSR block). The configuration and status register block enables runtime configuration of the intellectual property block. In addition, the configuration and status register block enables a user to read back statuses of operations within the intellectual property block.

However, the configuration and status register block may at times be as large as an intellectual property block. This is because the size of the configuration and status register block depends on the runtime features of the IP block. The configuration and status register blocks that are offered by most companies are designed to provide all of the available runtime features and read back all of the available statuses of the IP block. However, only certain runtime features of the CSR block are used by the users (i.e., only a portion of CSR block is used). The remaining portions of the configuration and status register block, therefore, are redundant at least for that user.

SUMMARY

Embodiments described herein include a customizable configuration and status register (CSR) of an intellectual property (IP) block. It should be appreciated that the embodiments can be implemented in numerous ways, such as a process, an apparatus, a system, a device, or a method. Several embodiments are described below.

In one embodiment, a method for generating configuration information using a computer aided design (CAD) tool includes a step to receive one or more intellectual property blocks. Furthermore, the method includes a step to receive a configuration and status register (CSR) data file for each intellectual property block. Each configuration and status register data file includes information on user selected runtime features. The user selected runtime features may be only a portion of runtime features from all of the available runtime features information of the one or more intellectual property blocks. The method also includes a step to generate one or more configuration and status register blocks based on the configuration and status register data files. In addition, the method may also include a step to generate a consolidated configuration status register block based on the configuration and status register files.

Further features of the invention, its nature and various advantages will be more apparent from the accompanying drawings and the following detailed description of the preferred embodiments.

DETAILED DESCRIPTION

The following embodiments include a customizable configuration and status register (CSR) of an intellectual property (IP) block. The CSR may include registers that control runtime features of an intellectual property block within a field programmable gate array (FPGA). Each IP block may be capable of having multiple runtime features. Therefore, the number of registers forming the CSR is high when the number of runtime features of the IP blocks is high. However, not all of the runtime features are utilized. The customized CSR may be significantly smaller in size than a standard CSR of an IP block. The unutilized runtime features may be omitted when the CSR is customized.

It will be obvious, to one skilled in the art, that the present exemplary embodiments may be practiced without some or all of these specific details. In other instances, well-known operations have not been described in detail in order not to unnecessarily obscure the present embodiments.

Throughout this specification, when an element is referred to as being "connected" or "coupled" to another element, it may be directly connected or coupled to the other element or electrically connected or coupled to the other element with yet another element interposed between them.

Figure 1:
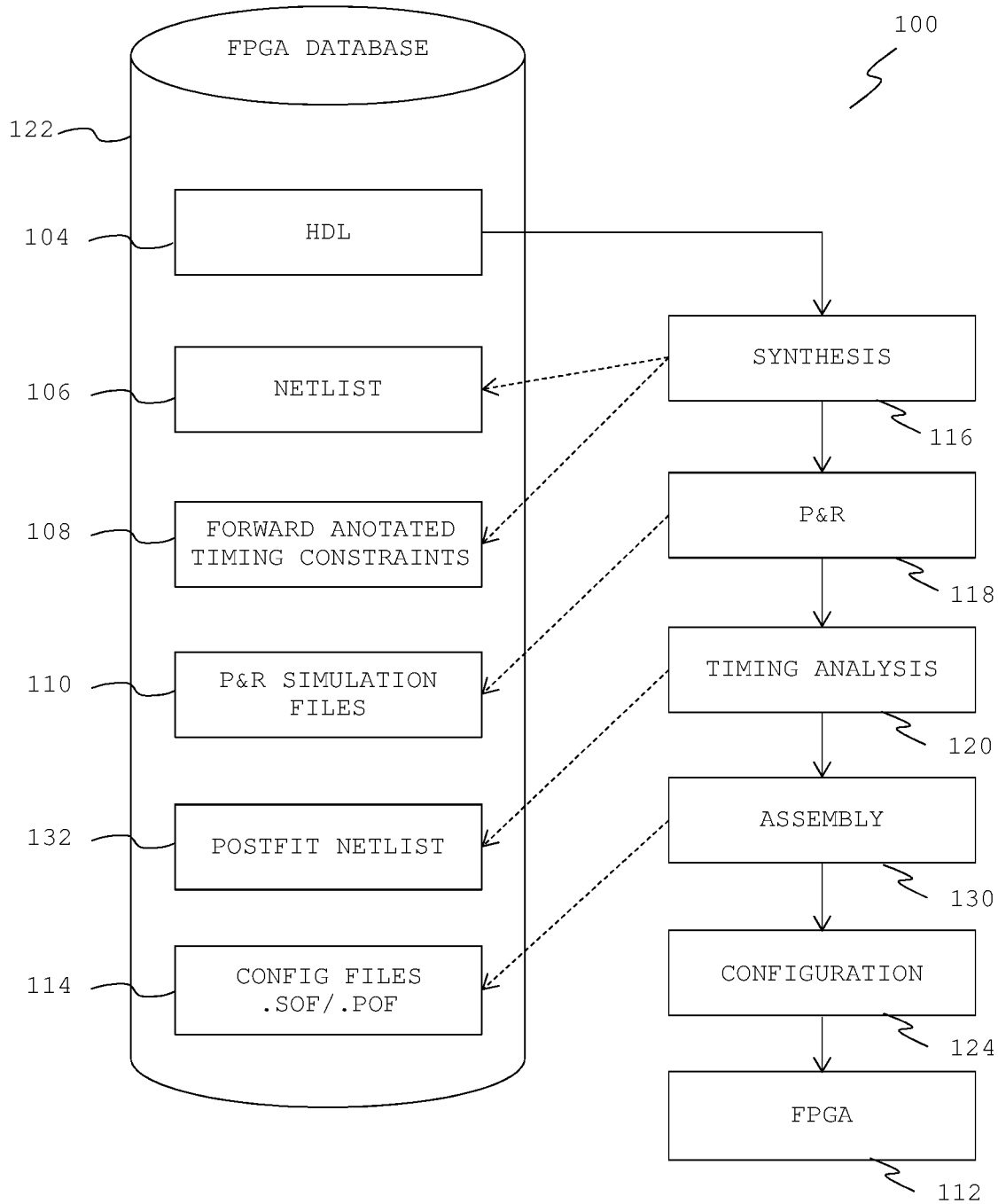
FIG. 1 shows an illustrative compilation process for a computer aided design (CAD) tool in accordance with one embodiment.

FIG. 1, meant to be illustrative and not limiting, illustrates compilation process 100 to create a compiled design for a programmable logic device (PLD), in particular a field programmable gate array (FPGA) device, using a computer aided design (CAD) tool. In one embodiment, the CAD tool may be the Quartus Prime tool, as provided by Altera Corporation.

The process starts with an integrated circuit (IC) design produced by an engineer and embodied in hardware description language (HDL) files 104. HDL files 104 may contain description of circuitry that is to be implemented on the FPGA. HDL files 104 may include descriptions of multiple intellectual property (IP) blocks coupled together with interconnect blocks, in one embodiment.

The multiple IP blocks may be placed on a design interface provided by the CAD tool. An IP block, for example, could be a digital signal processor block, an embedded processor block, an interface protocol block, a memory controller block, an optical transport network (OTN) block, a peripheral interface block or a phase-locked loop (PLL) block. By invoking a subset tool within the CAD tool, the IP blocks may be interconnected. In one exemplary embodiment, the subset tool may be a QSYS integration tool that is part of the Quartus Prime tool. The QSYS integration tool generates communication means (i.e., interconnections)

between the IP blocks. In one embodiment, the interconnections generated by the QSYS integrated tool may be based on Avalon interconnections.

During synthesis 116, HDL files 104 are parsed to create a basic discrete netlist 106 of logic-gate primitives, which may then be optimized. Synthesis 116 also generates forward annotated timing constraints 108. Synthesis is typically divided into phases and steps within the phases. At any point in time during synthesis 116, the circuit representation is complete, self-contained and equivalent to the HDL design. Most operations are optional, in the sense that the removal of the operation will not stop the CAD tool from reaching a solution. However, the solution quality may be impacted when the optional operations are removed.

Place and route 118, timing analysis 120 and assembly 130 operations follow synthesis 116. Place and route simulation files 110 are generated during place and route 118 operation. After place and route 118, timing analysis 120 assigns delays to the different gates and wires in the circuit, and creates postfit netlist 132. Timing analysis 120 computes the lengths of paths in the circuits and how the delays relate to the constraints of the circuit.

During assembly 130, the CAD tool produces binary configuration files 114 with a description of the circuit to be used during device programming 124 of electronic device 112. The resulting binary file 114 can be stored in non-volatile memory for later retrieval during device programming 124 of device 112. The different files created during the compilation of the device are kept in FPGA database 122.

Figure 2:
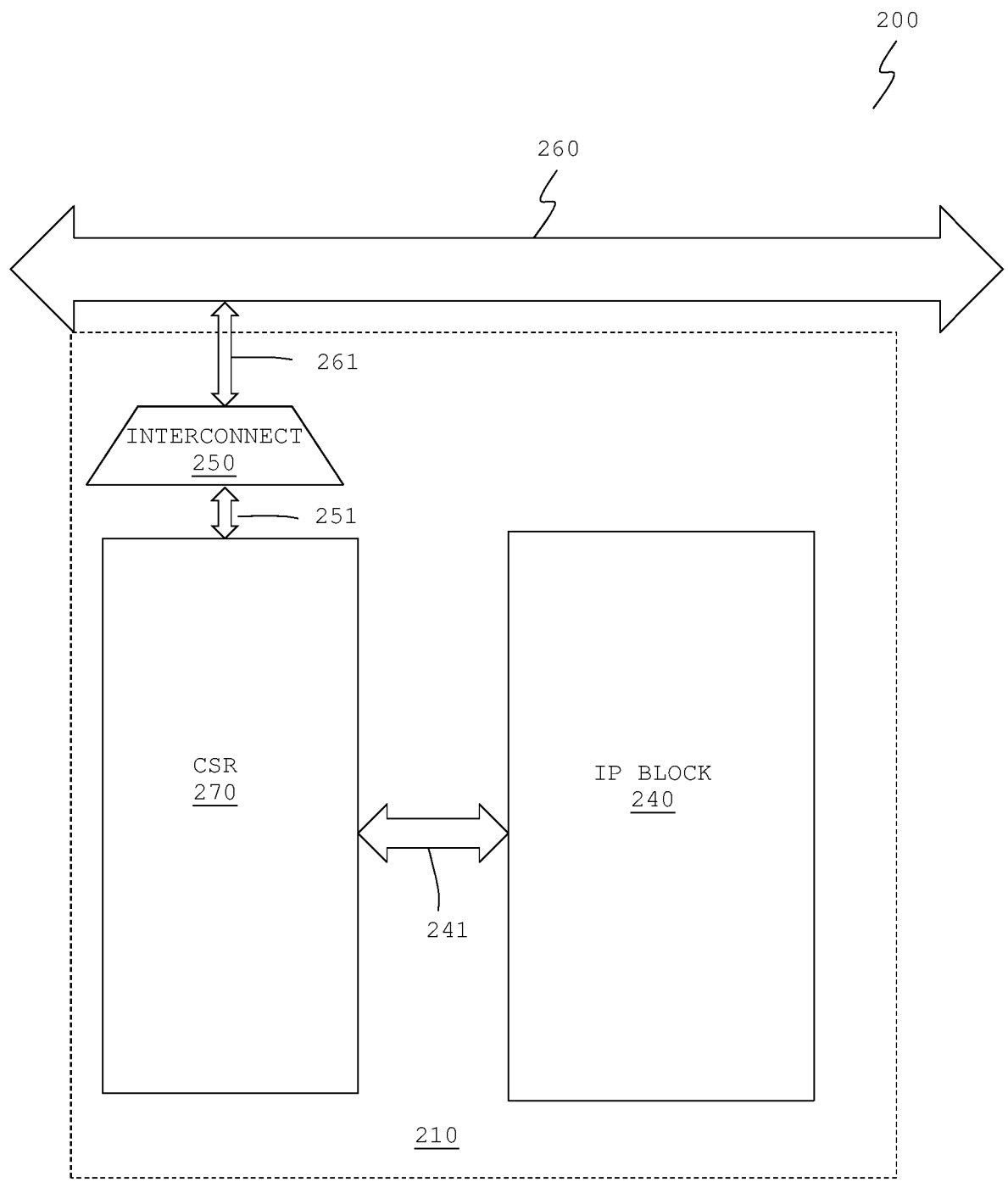
FIG. 2 shows an illustrative intellectual property (IP) system in accordance with one embodiment.

FIG. 2, meant to be illustrative and not limiting, illustrates an IP system in accordance with one embodiment of the present invention. Intellectual property system 200 may be formed by device programming 124 of binary file 114 into an electronic device 112 (e.g., a PLD or an FPGA), specifically the programmable logic elements and programmable routings within the electronic device. Intellectual property system 200 may include a digital signal processor circuit, an embedded processor circuit, an interface protocol circuit, a memory controller circuit, an optical transport network circuit, a peripheral interface circuit, a phase-locked loop circuit or interconnect circuitry between sub-IPs.

In the embodiment of FIG. 2, IP system 200 includes transmission bus 260 and IP circuitry 210. Intellectual property circuitry 210 further includes interconnect circuit 250, CSR circuitry 270 and IP block 240. Transmissions bus 260 is coupled to interconnect circuitry 250 whereas CSR circuitry 270 is coupled to interconnect circuitry 250 and IP block 240.

In one embodiment, IP system 200 may be designed according to a master-slave architecture. The master-slave architecture enables a unidirectional communication from one circuit to another circuit. In FIG. 2, IP block 240 is a slave circuit. It should be appreciated that IP system may be designed to implement other types of architectures (e.g., a one-to-one architecture, a bidirectional architecture, etc.).

Transmission bus 260 may include multiple signal transmission pathways. Transmission bus 260 may be utilized to transmit information from one circuit to another circuit within a device. It should be appreciated that the information may be formed from different widths. For example, in one embodiment, the information may be 32-bits wide. In another embodiment, the information may be 16-bits wide. Referring specifically to IP system 200, transmission bus 260 may be utilized to transmit information between a master circuit (e.g., a processor circuit or another IP block, which is not shown) and a slave circuit (e.g., IP block 240). In one exemplary embodiment, the master circuit that is coupled to transmission bus 260 may be a soft processor (e.g., a NIOS II processor) or a hard processor (e.g., an ARM processor).

Referring still to FIG. 2, transmission bus 260 is coupled to interconnect circuit 250 through signal transmission pathways 261. Interconnect circuit 250 is further coupled to CSR circuitry 270 through signal transmission pathways 251. Interconnect circuit 250, signal transmission pathways 261 and signal transmission pathways 251 may have similar number of transmission pathways as transmission bus 260 (e.g., to carry information that is either 16-bits wide or 32-bits wide), in one exemplary embodiment. Therefore, transmission pathways 251, interconnect circuit 250 and transmissions pathways 261 may have at least 16 signal pathways to transmit the 16 bits wide information or at least 32 signal pathways to transmit 32-bits wide information. Generally, the information (and its bit size) depends on the data and/or control information that are being supplied to IP block 240 and CSR circuitry 270.

IP block 240 forms a core circuit of IP circuitry 210. For example, IP block 240 may be a memory controller block when IP circuitry 210 is utilized to control a memory circuit. Alternatively, IP block 240 may be a digital processing block when IP circuitry 210 is utilized for processing digital signals. It should be appreciated that a user selects IP circuitry 210 based on IP block 240.

Each IP block 240 may include multiple runtime features. For example, a memory controller may have runtime features such as: (A) accessing different number of bits simultaneously, and/or (B) adjusting voltage levels for detecting a logic '1' or a logic '0' by a sense-amp circuit within a memory circuit. Although IP block 240 may include multiple runtime features, only some of the runtime features may be utilized by a user in his/her application. For example, one user may utilize only the runtime feature (A) whereas another user may utilize only runtime feature (B). Only in some instances, a user may utilize both run time features (A) and (B).

The runtime features on IP block 240 are enabled through CSR circuitry 270. In one instance, CSR circuitry 270 may be configured in such a manner as to enable only selected runtime features from the available runtime features (e.g., either run time feature (A) or (B)). In another instance, CSR circuitry 270 may be configured to enable all runtime features (e.g., both runtime features). Generally, a size of the CSR circuitry is proportional to the number of registers needed to enable the various selected runtime features and/or to read various statuses of an IP block. A CSR circuit providing a user with all of the runtime features that are available for a particular IP block may have a size similar to the size of the IP block. However, as stated above in the Background section, only selected runtime features for the IP block are used in most situations. Therefore, CSR circuitry 270 may include only registers that help to control user intended runtime features and that help to read statuses of IP block 240 that the user intended. Therefore, by selectively adding registers that correspond to user intended runtime features, the size of CSR circuitry 270 may be relatively smaller than that of a CSR circuit that provides all of the runtime features for IP block 240.

The run time features can be accessed by a user through CSR circuitry 270. For example, when IP block 240 is a memory controller and CSR circuitry 270 is enabled for runtime feature (A), the user may be allowed to read at least one bit or two bits simultaneously. Hence the memory controller (e.g., IP block 240) may provide one bit from the memory circuit when the user configures the registers within the CSR circuitry 270 to provide one bit. Alternatively, the memory controller (e.g., IP block 240) provides two bits from the memory circuit when the user configures the registers within the CSR circuitry 270 to provide two bits.

In one embodiment, CSR circuitry 270 may receive configuring information from a user through interconnect bus circuit 260, signal transmission pathways 261, interconnect circuit 250 and signal transmission pathways 251. CSR circuitry 270 is coupled to IP block 240 through interconnect circuit 241. CSR circuitry 270 may communicate with IP block through interconnect circuit 241. The data, command and status may be transmitted through interconnect circuit 241. For example, when IP block 240 is a memory controller, a command to read or write may be transmitted from CSR circuitry 270 to IP block 240 through interconnect circuit 241.

Figure 3:
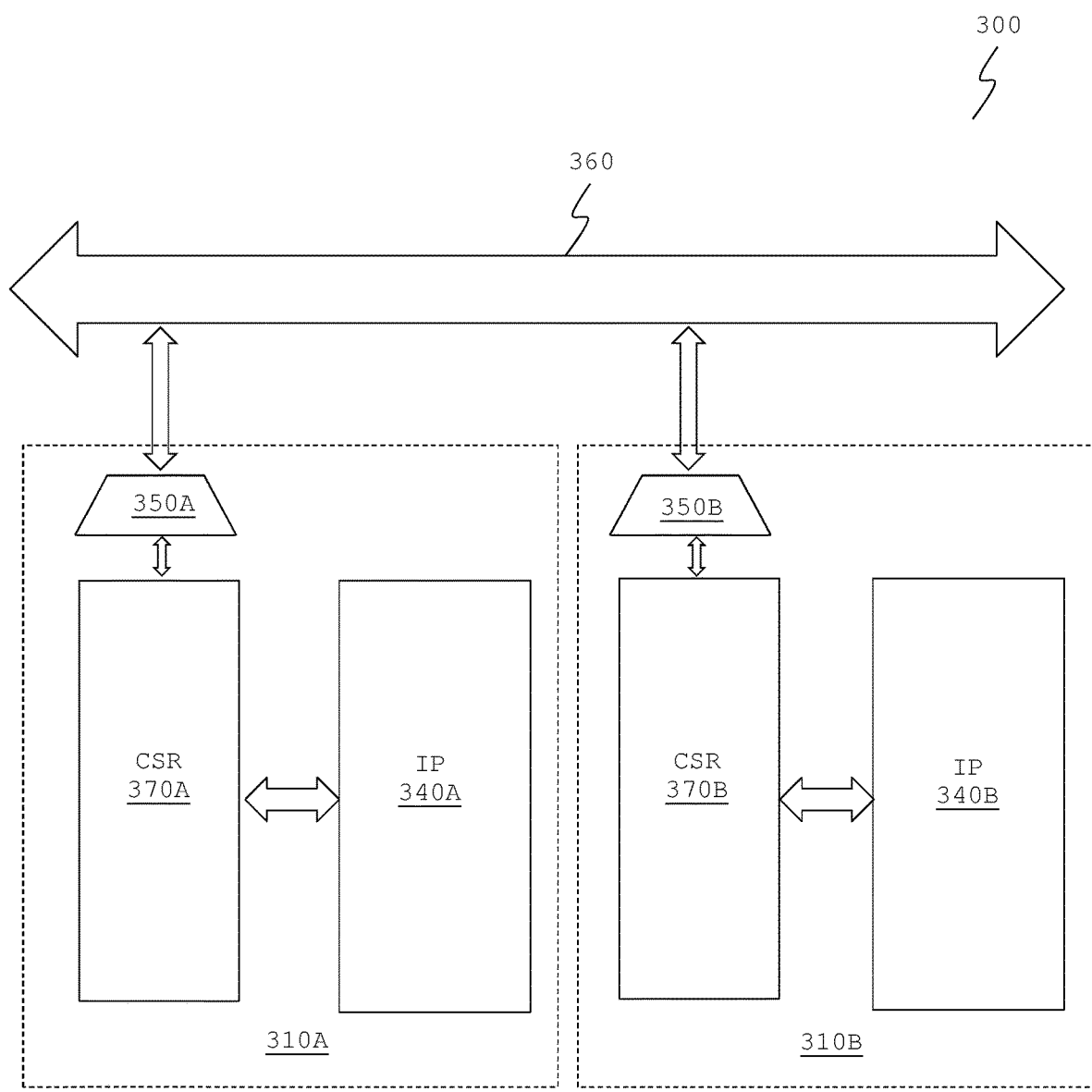
FIG. 3 shows multiple IP circuitries in an IP system in accordance with one embodiment.

FIG. 3, meant to be illustrative and not limiting, illustrates multiple IP circuitries in an IP system in accordance with one embodiment of the present invention. Similar to IP system circuitry 200 of FIG. 2, IP system 300 includes interconnect bus circuit 360 and two IP circuitries 310A and 310B. Each IP circuitry 310A or 310B in itself may be similar to IP circuitry 210 of FIG. 2. In the embodiment of FIG. 3, IP circuitry 310A includes interconnect circuitry 350A, CSR circuitry 370A and IP block 340A. Intellectual property circuitry 310B includes interconnect circuitry 350B, CSR circuitry 370B and IP block 340B. In one embodiment, interconnect circuitry 350A and 350B, CSR circuitry 370A and 370B and IP block 340A and 340B may be similar to interconnect circuitry 250, CSR circuitry 270 and IP block 240 of FIG. 2, respectively.

Similar to IP system 200 of FIG. 2, IP system 300 may be formed by device programming 124 of binary file 114 into an electronic device 112 (e.g., a PLD or an FPGA) of FIG. 1. It should be appreciated that binary file 114 for IP system 300 may be different than binary file 114 for IP system 200. However, there may be one binary file 114 of FIG. 1 for IP circuitry 310A and 310B when they are formed on a single FPGA.

Similar to the description in FIG. 2, each IP block 340A and 340B may include multiple runtime features although only some of the runtime features are utilized by a user in its application. For example, IP circuitry 310A may be configured to enable different types of runtime features than IP circuitry 310B even when IP circuitry 310A and 310B are similar. This can be further illustrated by an example of IP circuitry 310A and 310B as memory controller circuits whereby IP circuitry 310A may be enabled for only runtime feature (A), whereas IP circuitry 310B may be enabled for only runtime feature (B).

In another exemplary embodiment of FIG. 3, IP circuitry 310A may be configured to enable similar types of runtime features as configured for IP circuitry 310B when IP circuitry 310A and 310B are similar. This can be further illustrated by giving an example of IP circuitry 310A and 310B as a memory controller when IP circuitry 310A and 310B may be enabled for the runtime feature (A) only, (B) only or both (i.e., (A) and (B)).

Figure 4:
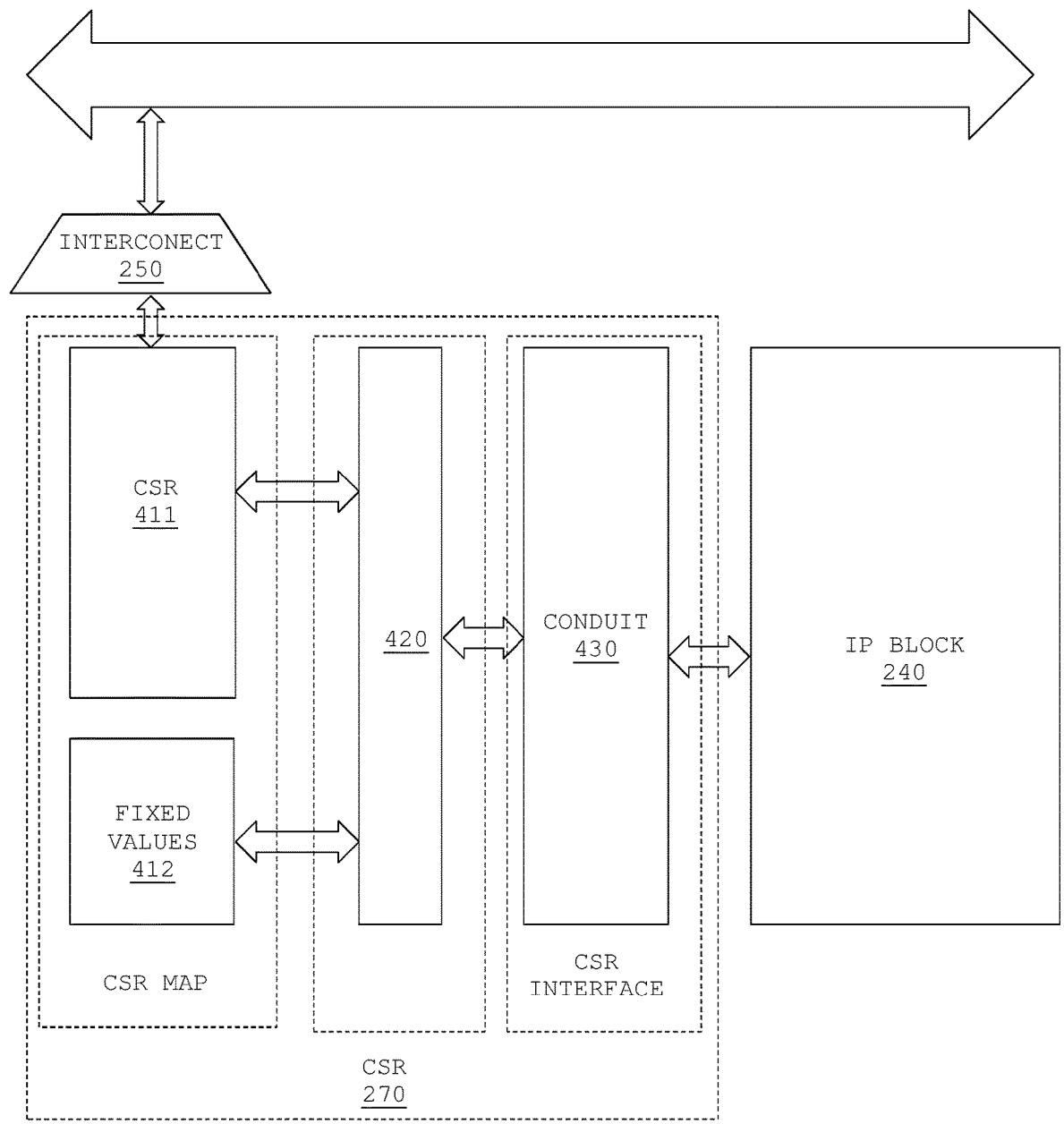
FIG. 4 shows a detailed implementation of CSR circuitry in accordance with one embodiment.

FIG. 4, meant to be illustrative and not limiting, illustrates a detailed implementation of CSR circuitry 270 in accordance with one embodiment of the present invention. As shown in the embodiment of FIG. 4, CSR circuitry 270 includes CSR registers 411, fixed values registers 412, clock crossing logic 420 and conduit 430. In one embodiment, CSR registers 411 and fixed value registers 412 may be also known as a CSR map, and conduit 430 may also be known as a CSR interface.

CSR registers 411 may control a particular runtime feature of IP block 240. For example, if CSR registers 411 are tied to runtime feature (A) of IP block 240, CSR registers 411 control whether a user reads a single bit or two bits. In one embodiment, based on the particular information configured in CSR registers 411, the user may be able to read a single bit using IP block 240 (e.g., a memory controller circuit). In an alternative embodiment, based on different information configured in CSR registers 411, the user may be able to read two bits using IP block 240 (e.g., a memory controller circuit). Furthermore, CSR registers 411 may be utilized to read a particular status of the registers of IP block 240.

Fixed value registers 412 hold certain parameters of IP block 240. For example, parts of IP block 240 may be tied to a power voltage level or a ground voltage level. As these values are not altered, they are referred to as fixed values.

Clock crossing logic 420 is coupled between CSR registers 411 and fixed value registers 412 (the CSR map circuits) and conduit 430 (the CSR interface circuits). In one embodiment, clock crossing logic 420 forms an intermediary circuit between circuitry that operates at different clock frequencies. For example, clock crossing logic 420 may facilitate communications between IP block 240, which may be operating at 1 Gigahertz (GHz), and CSR registers 411 and/or fixed value registers 412, which may be operating at 500 Megahertz (MHz).

Conduit 430 is coupled between clock crossing logic 420 and IP block 240. Conduit 430 may be designed to serve as an interface between CSR circuitry 270 and IP block 240.

Figure 5:
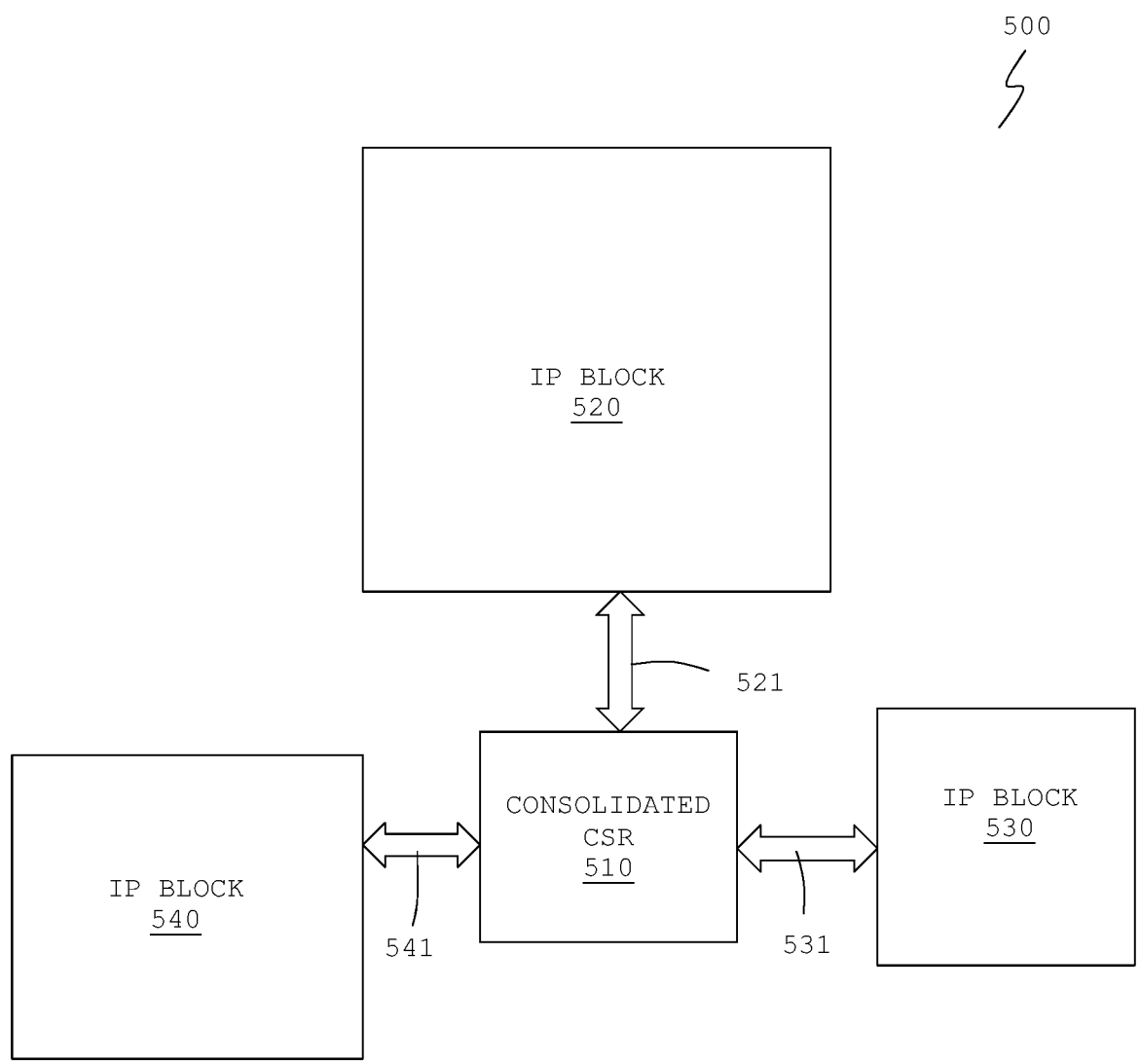
FIG. 5 shows multiple illustrative IP blocks sharing consolidated CSR circuitry in accordance with one embodiment.

FIG. 5, meant to be illustrative and not limiting, illustrates multiple IP blocks sharing consolidated CSR circuitry in accordance with one embodiment of the present invention. As shown in the embodiment of FIG. 5, IP system 500 includes IP blocks 520, 530 and 540 and consolidated CSR circuitry 510. In one embodiment, IP blocks 520, 530 and 540 may be functionally identical. Alternatively, IP blocks 520, 530 and 540 may be different. Intellectual property blocks 520, 530 or 540 may be similar to IP block 240 of FIG. 2, in one embodiment. Intellectual property blocks 520, 530 and 540 may be coupled to consolidated CSR circuitry 510 through their respective interconnect circuits 521, 531 and 541. In one embodiment, interconnect circuits 521, 531 and 541 may be similar to interconnect circuit 241 of FIG. 2.

In the embodiment of FIG. 5, consolidated CSR circuitry 510 is shared by IP blocks 520, 530 and 540. Consolidated CSR circuitry 510 may be utilized to enable runtime features that are enabled on all three IP blocks 520, 530 and 540. However, it should be appreciated that consolidated CSR circuitry 510 may also be utilized to enable runtime features that are available exclusively on IP block 520, 530 or 540.

As described earlier, the number of registers that forms CSR circuitry 510 determines the size of CSR circuitry 510. Therefore, consolidated CSR circuitry 510 for the three IP blocks 520, 530 and 540 may have smaller size than the cumulative size of three separate CSR circuitry blocks that would correspond to IP blocks 520, 530 and 540. Intellectual property system 500 may be formed using a significantly fewer logic elements within a PLD/FPGA compared to individual CSR circuitry for each IP block 520, 530 and 540.

It should be appreciated that a PLD/FPGA may include different configurations of IP systems. In one embodiment, the PLD/FPGA may include either IP system 300 of FIG. 3 or IP system 500 of FIG. 5. Alternatively, the PLD/FPGA may include a combination of IP system 300 of FIG. 3 and IP system 500 of FIG. 5.

Figure 6:
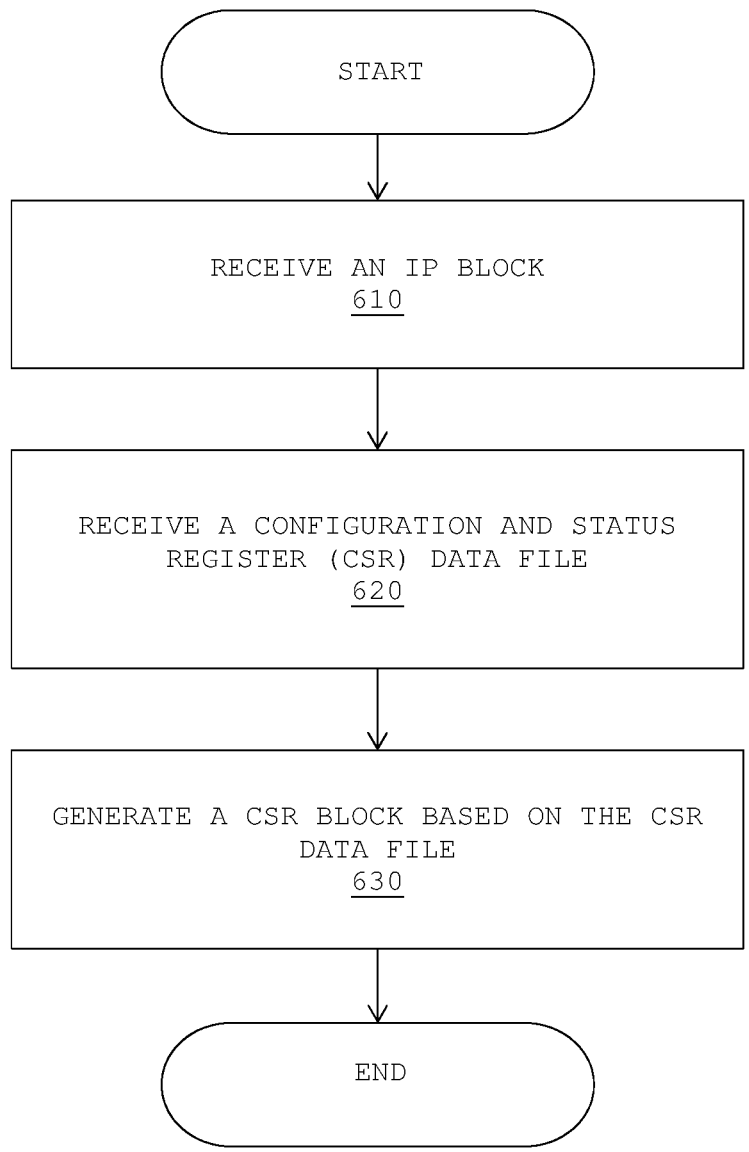
FIG. 6 shows a flowchart of an illustrative method of generating configuration information in accordance with one embodiment.

FIG. 6, meant to be illustrative and not limiting, illustrates a flowchart of a method of generating configuration information in accordance with one embodiment of the present invention. The configuration information may be within binary file 114 of FIG. 1. The method of generating configuration information (e.g., steps 610-630 may be performed using a CAD tool (e.g., Quartus II).

At step 610, an IP block is received. In one embodiment, the IP block may be selected from a library of IP blocks that are available for the CAD tool. Alternatively, the IP block may be generated by a user. In one embodiment, the IP block may be similar to IP block 240 of FIG. 2. The IP block may be capable of having multiple runtime features although these runtime features are only enabled when a corresponding CSR circuit is formed.

At step 620, a CSR data file is received. The CSR data file is separate from the IP block. In one embodiment, the CSR data file includes information to generate CSR circuitry. In one embodiment, the CSR circuitry may be similar to CSR circuitry 270 of FIG. 2. The CSR data file may include information to generate circuits that enables a selected portion of runtime features of the IP block. In one embodiment, the CSR data file may be in any CSR abstraction format (e.g., an IP-XACT format). It should be appreciated that IP-XACT format is an XML format.

At step 630, a CSR block is generated based on the CSR data file. In one embodiment, the CSR block is generated by a CSR generator, which forms part of the CAD tool. The CSR generator may read and compile the CSR data file to generate the CSR block. In one embodiment, the CSR block may be similar to CSR circuitry 270 of FIG. 2. In addition to that, the CSR block may have details as shown in CSR circuitry 270 of FIG. 4.

Once step 630 completes, the CSR block may be coupled to the IP block. In one embodiment, the interconnection that couples the CSR block and IP block may be an Avalon-based interconnection, AMBA-based interconnection or an AXI-based interconnection.

Figure 7:
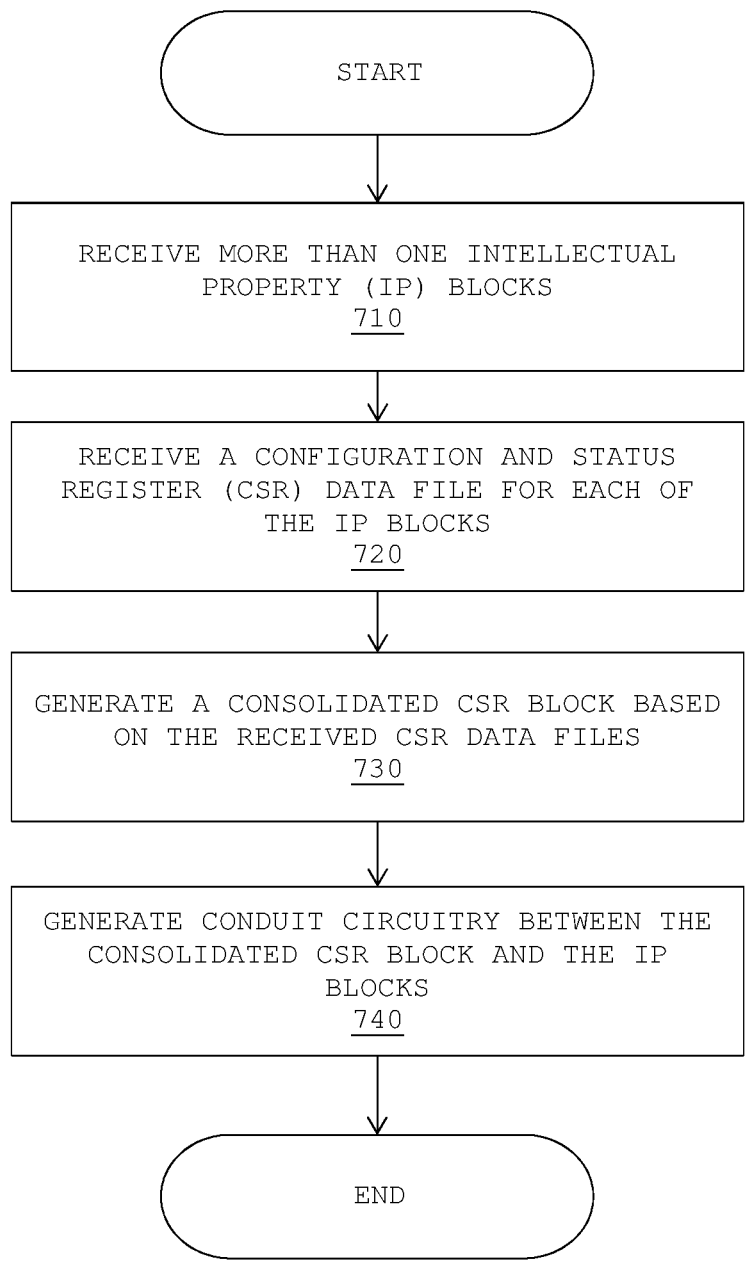
FIG. 7 shows a flowchart of an illustrative method of generating configuration information in accordance with one embodiment.

FIG. 7, meant to be illustrative and not limiting, illustrates a flowchart of a method for generating configuration information in accordance with one embodiment of the present invention. Similar to the method in FIG. 6, the configuration information may be within binary file 114 of FIG. 1 and the method of generating configuration information may be through a CAD tool (e.g., Quartus II).

At step 710, multiple IP blocks are received. In one embodiment, the IP blocks may be similar to IP blocks 310A and 310B of FIG. 3 or IP blocks 520, 530 and 540 of FIG. 5.

At step 720, a CSR data file for each IP block is received. For example, when there are two IP blocks (e.g., IP blocks 310A and 310B of FIG. 3), two CSR data files are received. Similar to FIG. 6, the CSR data files may include information to generate CSR circuitry for the IP blocks. The CSR data files may include information to generate circuits that enable a selected portion of runtime features for the IP blocks. In one embodiment, the CSR data files may include registers that enable similar runtime features on the IP blocks.

At step 730, a consolidated CSR block is generated based on the received CSR data files. The consolidated CSR block may be similar to consolidated CSR circuit 510 of FIG. 5. The consolidated CSR block may include a portion of a circuit that is shared by multiple IP blocks and a portion that may be exclusive to a particular IP block. The consolidated CSR block may be generated through a CSR generator.

At step 740, conduit circuitry is generated between consolidated CSR block and the IP blocks. In one embodiment, conduit circuitry may be similar to interconnect circuits 521, 531 and 541 of FIG. 5. In one embodiment, the conduit circuitry may bean Avalon interconnection, AMBA interconnection or AXI interconnection.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IC circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the families of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing invention has been described in some detail for the purposes of clarity, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method implementing an integrated circuit using a computer aided design (CAD) tool, comprising:
   receiving an intellectual property block;
   receiving a configuration and status register (CSR) data file, wherein the configuration and status register data file configures a configuration and status register (CSR) block to provide access to a user selected subset of runtime features from all available runtime features for the intellectual property block, wherein the size of the CSR block is limited by the number of runtime features in the user selected subset of runtime features;
obtaining the integrated circuit; and
generating a configuration file that includes the intellectual property block and the CSR block and loading the configuration file into the integrated circuit.

2. The method as defined in claim 1 wherein the configuration and status register data file further includes fixed values features for the intellectual property block.

3. The method as defined in claim 1, wherein the configuration and status register data file is in an IP-XACT format.

4. The method as defined in claim 1, further comprising:
coupling the configuration and status register block to the intellectual property block.

5. The method as defined in claim 4, further comprising:
forming an interface conduit to couple the configuration and status register block to the intellectual property block.

6. The method as defined in claim 5, wherein the interface conduit is selected from a group of interconnections that consist of: Avalon interconnections, advanced microcontroller bus architecture (AMBA) interconnections, and advanced extensible interface (AXI) interconnections.

7. A method of implementing an integrated circuit using a computer aided design (CAD) tool, comprising:
receiving first and second intellectual property blocks;
receiving first and second configuration and status register (CSR) data files, wherein the first configuration and status register data file includes information for generating a first configuration and status block for the first intellectual property block, and wherein the second configuration and status register data file includes information for generating a second configuration and status block for the second intellectual property block;
generating a consolidated configuration and status register block based on the first and second configuration and status register data files, wherein the consolidated CSR block is shared by the first and second intellectual property blocks;
obtaining the integrated circuit; and
generating a configuration file that includes the first and second intellectual property blocks and the consolidated CSR block and loading the configuration file into the integrated circuit.

8. The method as defined in claim 7, wherein generating the consolidated configuration and status and register block further comprises:
generating first and second conduit interface circuits, wherein the first conduit interface circuit couples the consolidated configuration and status register block to the first intellectual property block, and wherein the second conduit interface circuit couples the consolidated configuration and status register block to the second intellectual property block.

9. The method as defined in claim 7, wherein runtime features that are available on the first and second intellectual property blocks are activated using configuration information of the consolidated configuration and status register block.

10. The method as defined in claim 7, wherein the first and second configuration and status register data files comprises identical runtime features.

11. The method as defined in claim 7, wherein the first intellectual property block is a different type of intellectual property block than the second intellectual property block.

12. The method as defined in claim 7, wherein the first intellectual property block is functionally identical to the second intellectual property block.

13. The method as defined in claim 7, further comprising:
receiving a third intellectual property block that is different than the first and second intellectual property blocks;
receiving a third configuration and status register data file; and
generating a third configuration and status register block based on the third configuration and status register data files, wherein the third configuration and status register block is different than the consolidated configuration and status register block.

14. An integrated circuit, comprising:
intellectual property (IP) circuitry that provides a plurality of available runtime features; and
configuration status register circuitry that is coupled to the intellectual property block and that is configured to provide access to only a subset of the plurality of available runtime features from the intellectual property circuitry, wherein the size of the configuration status register circuitry is limited by the number of runtime features in the subset.

15. The integrated circuit as defined in claim 14, further comprising:
a conduit interface circuit that is coupled between the intellectual property circuitry and the configuration status register circuitry.

16. The integrated circuit as defined in claim 15, wherein the conduit interface circuit is selected from a group of interconnections consisting of: Avalon interconnections, advanced microcontroller bus architecture (AMBA) interconnections, and advanced extensible interface (AXI) interconnections.

17. The integrated circuit as defined in claim 14, further comprising:
additional intellectual property (IP) circuitry that provides additional runtime features; and
additional configuration status register circuitry that is coupled to the additional intellectual property block and that provides access to a portion of the additional runtime features from the additional intellectual property circuitry.

18. The integrated circuit as defined in claim 14, further comprising:
additional intellectual property (IP) circuitry that provides additional runtime features, wherein the configuration status register circuitry is coupled to the additional intellectual property block, and wherein the configuration status register circuitry provides access to a portion of the additional runtime features from the additional IP circuitry.

19. The integrated circuit as defined in claim 14, further comprising:
programmable logic circuitry that includes the intellectual property circuitry and the configuration status register circuitry.

* * * * *